July 7, 1931.  C. G. STRANDLUND  1,813,506
PLOW
Filed March 23, 1929  4 Sheets-Sheet 3
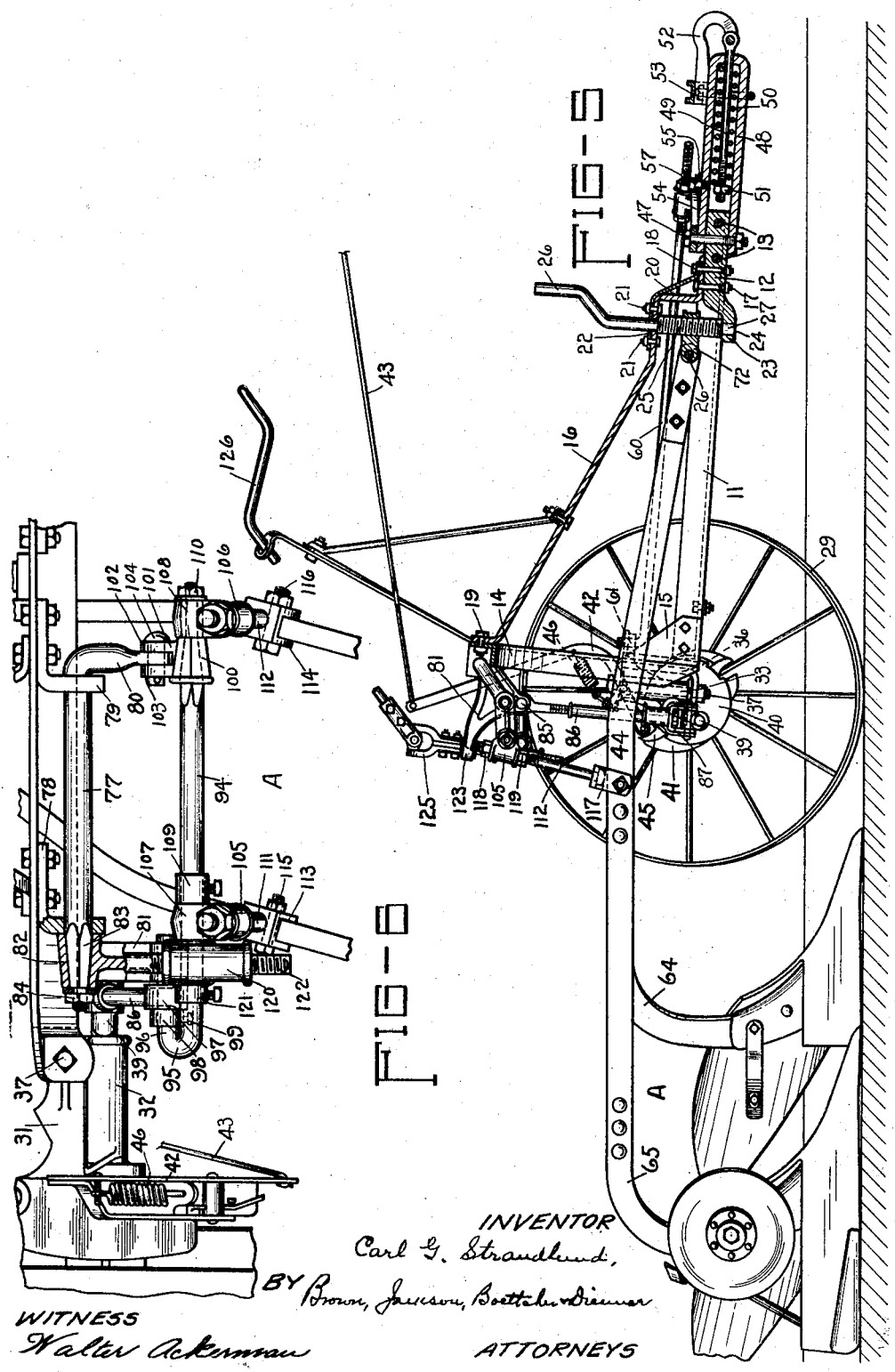
INVENTOR
Carl G. Strandlund,
BY Brown, Jackson, Boettcher & Dienner
ATTORNEYS
WITNESS
Walter Ackerman July 7, 1931. C. G. STRANDLUND 1,813,506
PLOW
Filed March 23, 1929 4 Sheets-Sheet 4
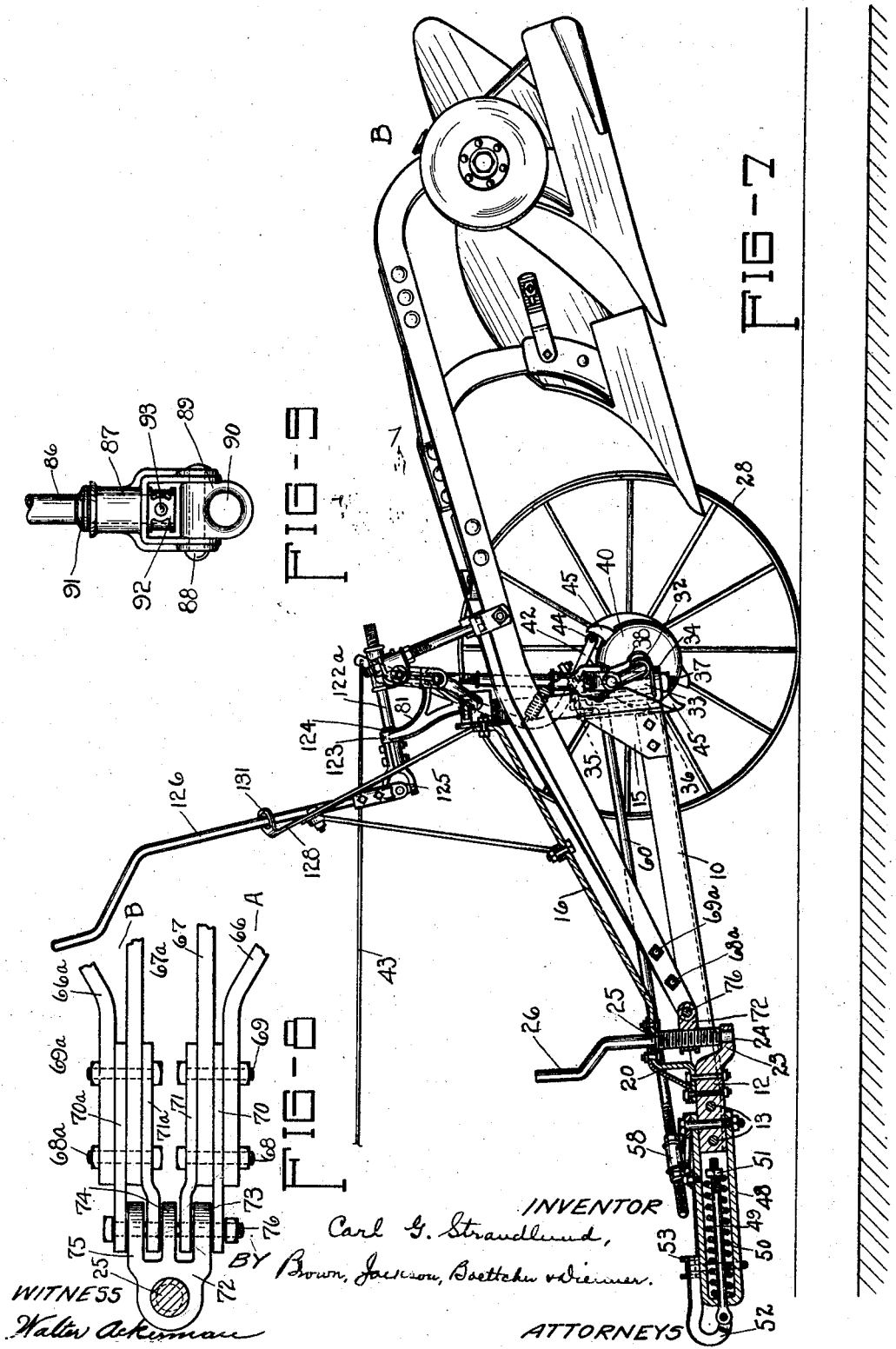

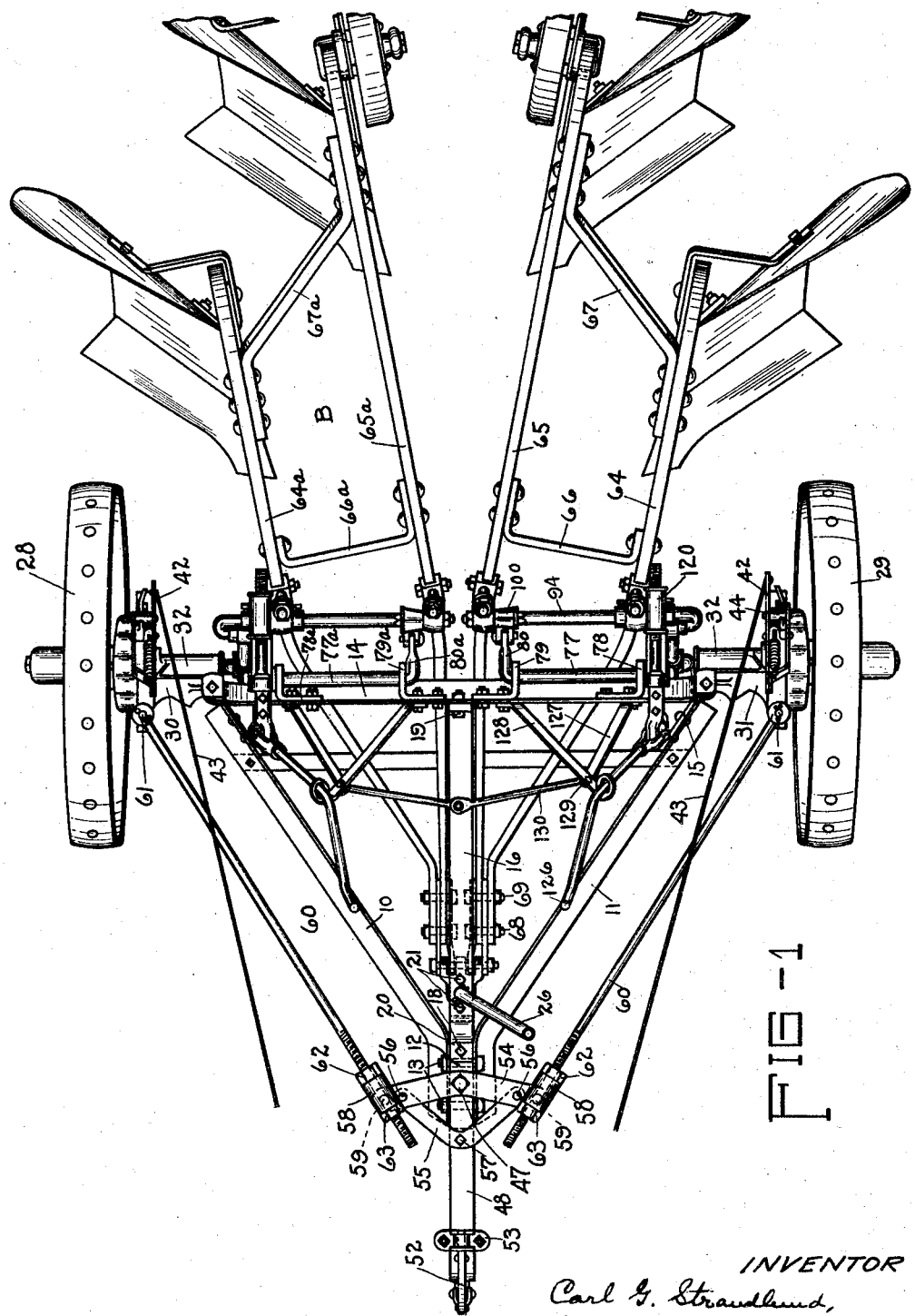

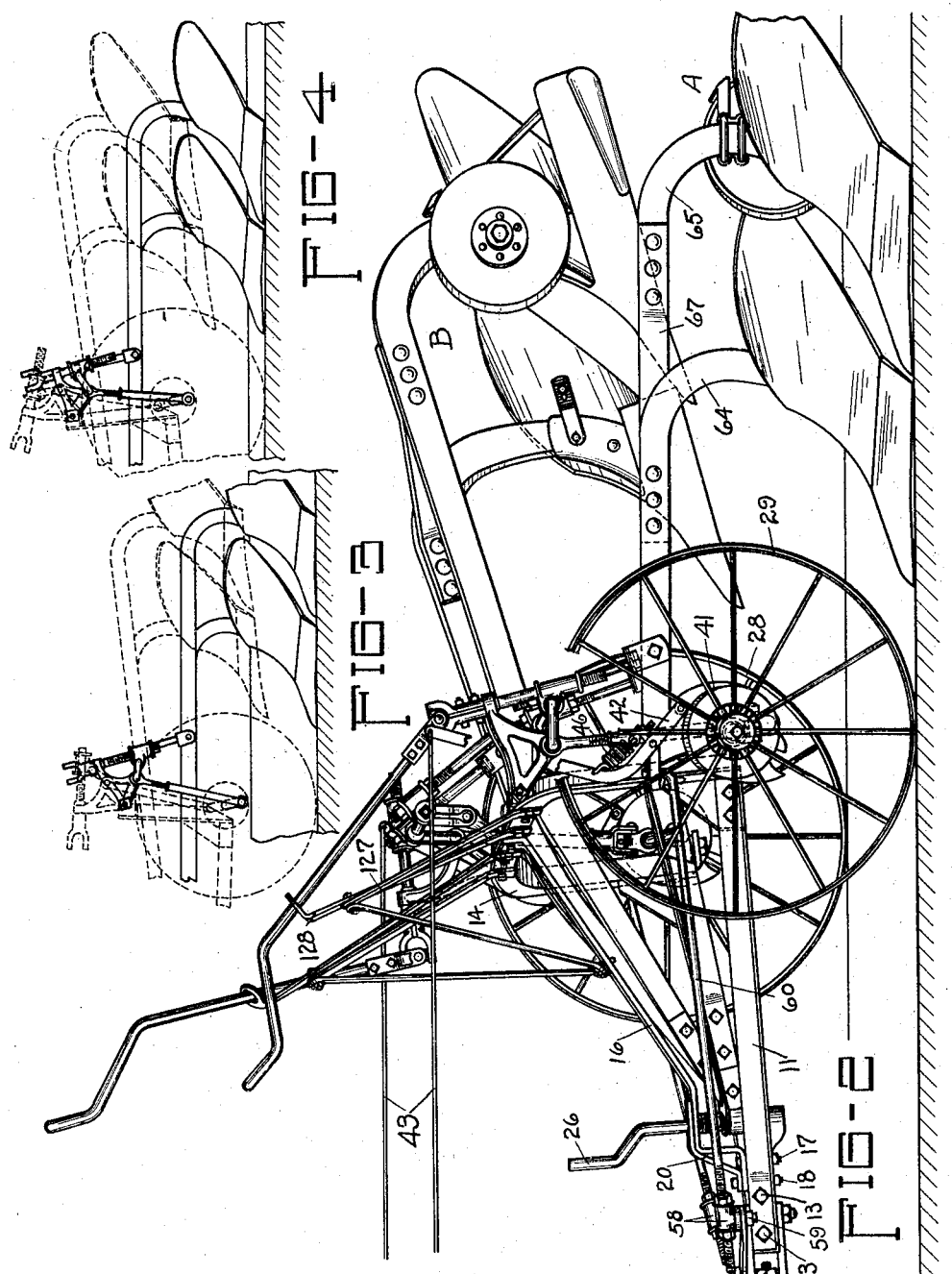

Patented July 7, 1931

1,813,506

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

PLOW

Application filed March 23, 1929. Serial No. 349,330.

This invention relates to what are known in the art as two-way plows, which is a type of plow comprising two plowing units arranged side by side, with their landsides next to each other so that they throw the furrow slice in opposite directions. The two units are arranged to be raised and lowered separately, and only one of them at a time is in operative position, the other being then raised and held in inoperative position. In using such a plow it is driven back and forth across the field, and each time the field is traversed the furrow slice is taken off the same end of the land. Such plows are intended for plowing on hillsides, where it is desirable to throw the soil downward, and in plowing irrigated fields, where it is important to keep the land in a level state and avoid dead furrows and landbacks, or ridges caused by throwing the dirt from two furrows on to an unplowed strip,—which, of course, results in the formation of two dead furrows. By the use of a two-way plow an open or dead furrow is formed at one side of the field only, and the next season the field may be plowed beginning at the opposite side, so that the previously formed dead furrow is filled with soil, thereby keeping the field level.

In my pending application, Serial No. 260,872, filed March 12, 1928, I have shown and described an improved two-way plow, one of the characteristics of which is that the two oppositely acting gangs diverge rearwardly, or converge forwardly, at a fixed angle to each other, the forward end portions of their respective beams or frames being connected to draft means lying in the center line of the plow, in such manner that the gangs may be raised and lowered as occasion requires during the operation of the plow. A rigid draft frame, preferably triangular in form, and having dirigible wheels at its opposite sides, is provided for guiding the plow and also for moving the gangs vertically into or out of operative position, as well as supporting the inoperative gang out of operative position, and these wheels are equipped with half revolution clutch mechanism for actuating lifting devices on the draft frame to lift the gangs out of operative position by the traction of the dirigible wheels. Draft means connected with the forward ends of the gangs is supported by the forward central portion of the draft frame, and provision is made for automatically steering the dirigible wheels in such manner that when either gang is lowered to operative position the center of resistance of such gang will move into substantial coincidence with a common line of draft lying in a longitudinal vertical plane that is substantially coincident with the center of power of the tractor or other drawing means.

The present invention has to do with certain improvements that may be applied very advantageously to two-way plows having the above described characteristics, and, therefore, in the accompanying drawings I have illustrated them as applied to such a plow, but it should be understood that my present invention is in many respects applicable to other plows and analogous implements, and, therefore, the claims hereinafter made are not to be restricted to the type of plow shown and described except in so far as they may include essential characteristics of such a plow.

In the following specification each plowing unit will be termed a gang, since in the illustrated construction it is composed of two rigidly connected beams each carrying a plow bottom, but that term is not intended to be restrictive of the number of beams and plow bottoms going to make up each plowing unit, but should be taken as comprehending one or more beams and plow bottoms operating as a unit.

In some types of plows, and particularly in two-way plows, where one gang is adapted to be lowered to operative position while the other gang is supported out of operative position, it is highly desirable that provision be made for lifting the latter gang high enough above the ground when the other gang is plowing in its deepest position, so that proper clearance will be provided between the inoperative plow and the ground. These plows are frequently used for shallow plowing as well as for deep plowing, and to insure proper clearance notwithstanding variation in the plowing depth, and at the same time to provide power operated means for lifting the gangs out of operative position and supporting them in such inoperative position, is one of the principal objects of my present invention. This object I accomplish by providing means that is separately operable to vary the depth of plowing without materially varying the height to which the gangs are lifted when raised out of operative position by the power operated mechanism, as will be hereinafter described in detail.

Another important feature of my invention is to provide for vertically adjusting the front ends of the beams or gang frames, arranged to cooperate with the devices for adjusting the depth of plowing, so that the gangs can be lowered horizontally, without tipping them so as to make the plows run out of the ground, and by which the front ends of the gang frames can be adjusted vertically to give the plows more or less suck, as required.

A further object is to improve the construction of plows of this character in various other respects which will be pointed out in connection with the description of the embodiment of my invention illustrated in the drawings. I accomplish these objects as hereinafter described. What I regard as new is set forth in the claims.

In the accompanying drawings,—

Fig. 1 is a plan view of my improved plow, the rear portions of the gangs being broken away, and the lifting devices being shown in the position they occupy when both gangs are lifted out of operative position;

Fig. 2 is a side elevation of the plow, the near gang being lowered to its operative position and the far gang being in its inoperative position;

Fig. 3 is a diagrammatic view showing in full lines the position of some of the parts when plowing a deep furrow, the dotted lines showing the lifted position of the same gang;

Fig. 4 is a view similar to Fig. 3, showing the position of the parts when plowing a shallow furrow;

Fig. 5 is a central longitudinal vertical section showing one of the gangs in its operating position;

Fig. 6 is a partial plan view illustrating certain parts of the lifting mechanism, with some portions in section;

Fig. 7 is a central longitudinal vertical section of the plow showing one of the gangs in its lifted or inoperative position;

Fig. 8 is a partial plan view showing the connections at the forward ends of the gangs by which such ends are vertically adjusted; and Fig. 9 is a detail, being a view illustrating the lower end of one of the connections through which power is transmitted from the clutch mechanism to the lifting devices for raising or lowering the gangs.

As shown in Fig. 1, the plow illustrated comprises a rigid draft frame which is best made triangular in form, and includes two forwardly converging side bars 10, 11, here shown as being made of angle iron, the forward ends of which side bars are rigidly connected together at the opposite sides of an intermediate draft bar 12. As best shown in section in Figs. 5 and 7. Bolts 13 connect these parts together. The rear ends of the side bars 10, 11 are rigidly connected with the downturned lower end portions of an arch bar 14, which is also preferably made of angle iron, as best shown in Fig. 5. This arch bar extends transversely of the draft frame and forms the third side of the triangular frame previously mentioned. Preferably reenforcing plates 15 are provided at the juncture of the side bars 10, 11 with the arch bar 14, as shown in Figs. 1 and 5. A brace 16, preferably in the form of a flat metal bar, has its forward end fixedly secured to the rear portion of the draft bar 12, as by bolts 17, 18 shown in Fig. 5, and its rear end secured, as by bolt 19, to the central portion of the arch bar 14, so that said brace extends fore and aft in an inclined position between the center of the arch bar 14 and the draft bar 12, as shown in Figs. 1 and 5. A reenforcing plate 20 is also preferably provided between the forward portion of the brace 16 and the draft bar 12, the forward end of said plate being secured by the bolt 18 and its rear end being fastened to the brace 16 by bolts 21.

As best shown in Figs. 5 and 7, those parts of the brace 16 and plate 20 through which the bolts 21 extend are bent so that they occupy a substantially horizontal position, as shown at 22 in Fig. 5, and the rear end portion of the draft bar 12 is extended to form a sort of bracket 23 that underlies said portion 22 and is provided with a hole or socket 24. The overlapping portions of the brace 16 and bar 20 are provided with holes that aline vertically with the hole 24, and in these holes is mounted the threaded lower end portion 25 of a crank 26 that extends up centrally at the front of the draft frame. The lower end of the crank 26 is turned down somewhat and made cylindrical, as shown at 27 in Fig. 5, so that it has a bearing fit in the hole 24, with the shoulder formed by turning down the end 27 resting on the upper surface of the bracket portion 23. The crank 26 also has a bearing fit in the holes in the brace 16 and plate 20 immediately above the screw-threaded portion 25, as shown in said figure. Thus the crank 26 is provided with upper and lower bearings in the draft frame at opposite sides of its screw-threaded portion 25, which latter is firmly supported in a vertical position. The function of this screw-threaded crank is to adjust the front ends of the gangs vertically and hold them in their different positions of adjustment. The connections by which this is accomplished will be described later.

At the opposite ends of the arch bar 14 are mounted dirigible ground wheels 28, 29 which support the rear portion of the draft frame, and are adapted to swing angularly about vertical axes with reference to the arch bar to steer the plow. To this end they are mounted on approximately horizontal spindles carried by brackets 30, 31 that are mounted on the vertically disposed end portions of the arch bar 14, as shown in Fig. 1. Each of these brackets comprises an approximately horizontal sleeve 32 that forms the lower portion thereof, and an upright sleeve 33 disposed approximately at right angles to the sleeve 32. The sleeve 33 is pivoted between the parallel turned ends 34, 35 of a bracket 36 fixedly secured to the vertical end portion of the arch bar 14, these parts being connected by a vertical bolt 37, as shown in Fig. 7. The arrangement is such that each sleeve 32 may swing approximately in a horizontal plane about the bolt 37 as an axis. Journaled in each of the sleeves 32 is a crank shaft 38 having a crank 39 at its inner end and a clutch member 40 at its outer end, the latter clutch member having a bearing against the outer end face of the adjacent sleeve 32. This clutch member is adapted to cooperate with a clutch member 41 secured to the hub of the adjacent wheel, at the inner end thereof, as shown in Fig. 2. The clutch members 40, 41 are of the well known half revolution type commonly used on power lift plows for raising and lowering the plow bottoms—that is to say, they are normally disconnected so that the wheel that carries the clutch member 41 may normally rotate freely without rotating the clutch member 40, this normal condition being maintained by means of a trip lever that automatically functions to disconnect the clutch members at the end of each half revolution of the clutch and hold them disconnected until the trip lever is momentarily again actuated by the operator.

The mounting of the ground wheels and the arrangement of the clutch mechanism is fully shown and described in my pending application hereinbefore referred to, and the construction of clutches of the type mentioned is well known in the art. It is therefore deemed unnecessary to illustrate or describe these parts in detail. It will suffice to point out that the trip levers are shown in the drawings at 42 and the cords by which they are operated are shown at 43. Said levers are pivotally mounted upon the brackets 30, 31, respectively, in such manner that the lower end of each trip lever overlies the periphery of the adjacent clutch member 40 and carries a roller 44 that rides on the peripheral portion of said clutch member and is adapted to engage a dog 45 that forms a part of the clutch mechanism and hold it out of operative position. A spring 46 normally holds the roller 44 in contact with the surface of the clutch member 40, and returns it to such position after each actuation of the trip lever. When operative connection is made between the two clutch members associated with either ground wheel, rotation of such ground wheel will cause the crank shaft 38 to rotate with the ground wheel, which, through suitable lifting connections hereinafter described, will lift the plow bottoms at that side of the plow, or permit them to drop into operating position, depending upon the position they occupy at the time the trip lever is actuated. As the trip lever and clutch mechanism associated with each ground wheel are carried by the bracket 30 or 31 as the case may be, when such ground wheel is swung angularly with reference to the arch bar 14, they swing with it, and are not affected by such swinging movement.

Pivotally connected with the forward end of the draft bar 12, by a vertical pivot 47, is a draft member 48 in the form of a spring trip clevis, preferably of the construction shown and described in my pending application, Serial No. 315,679, filed October 29, 1928. This clevis comprises an elongated U-shaped frame between the upper and lower members of which extends a bolt 49 on which is mounted a spring 50 arranged to be compressed between a nut 51 on the inner end of said bolt and the forward closed end of the clevis, as best shown in Fig. 5. The bolt 49 extends through a hole in the forward end of the clevis, and to it is pivotally connected a hook member 52, the free end of which is adapted to be embraced by a clip 53 mounted on the clevis 48 and movable longitudinally thereof. The arrangement is such that under undue load stresses the bolt 49 will be drawn out far enough against the tension of the spring 50 to release the free end of the hook 52 from the clip 53 and thereby disconnect the implement from the tractor or other draft power. This clevis construction is not herein claimed as it constitutes the subject-matter of my said pending application Serial No. 315,679.

The clevis 48 is adapted to swing laterally about the pivot 47 in response to deflection of the line of draft, and at its rear end it carries a cross-head 54 preferably secured to it by the bolt 47, as best shown in Figs. 1 and 5. Said cross-head is held in fixed relation to the clevis 48 by a V-shaped brace 55, the end portions of which are secured to the end portions of the cross-head 54, as by rivets 56, while its intermediate portion is secured by a bolt 57 to the clevis 48, as best shown in Figs. 1 and 5. By this construction, when the clevis 48 swings laterally the cross-head 54 swings with it.

At its outer ends the cross-head 54 is provided with sleeves 58 that are pivotally connected therewith to turn about vertical axes, as indicated by the pivot 59 shown in dotted lines in Fig. 1. These sleeves are connected with the outer end portions of the brackets 30, 31 by connecting rods 60, the rear end portions of said rods being pivotally connected at 61 to the outer portions of said brackets, and the forward portions of said rods extending through the sleeves 58 and being held in fixed relation thereto by nuts 62, 63 screwed upon the ends of said rods at opposite sides of the sleeves 58, as shown in Fig. 1. Thus, through the cross-head 54 and rods 60, when the clevis 48 is swung laterally the wheels 28, 29 will be correspondingly turned angularly with reference to the arch bar 14. The construction in this respect is substantially the same as that described in my pending application, Serial No. 260,872. It will be understood that the clevis 48 and the cross-head 54 together form a laterally rigid draft connection which may as a unit swing laterally about the point of attachment of the hook 52 with the draft power, and that the draft frame comprising the draft bar 12, side bars 10, 11 and the arch bar 14, may be swung angularly with reference to said draft connection about the vertical pivot 47, as described in the latter application.

In the illustrated construction I have shown the plow as comprising two gangs A, B, each being made up of two beams, the rear portions of which are parallel, while their forward ends converge and are secured together. Each of said beams carries a plow bottom arranged with its landside at the inner side of the plow. Thus the bottoms of the two gangs turn their respective furrow slices in opposite directions. In the drawings, 64, 65 indicate the beams of gang A, which beams are braced together by transverse and diagonal braces 66, 67.

Said beams are connected together at their forward ends by bolts 68, 69 that pass through them and through a pair of connecting bars 70, 71 that overlap the forward ends of the beams 66, 67 and are spaced apart by the latter so that the forward ends of the bars 70, 71 project beyond the beams 66, 67 and form a clevis by which the said beams may be attached to a double yoke 72 having three parallel arms 73, 74, 75 spaced apart, as shown in Fig. 8. The arm 73 is adapted to fit between the forward ends of the bars 70, 71, and the arm 75 is adapted to fit between corresponding bars 70$^a$, 71$^a$, that are secured to the beams 66$^a$, 67$^a$ of gang B, which are similar to the corresponding parts of gang A. Bolts 68$^a$, 69$^a$ connect the bars 70$^a$, 71$^a$ with the beams 66$^a$, 67$^a$, as shown in Fig. 8.

A bolt 76 extends horizontally through the arms 73, 74, 75 and also through the several bars 70, 71, 70$^a$, 71$^a$, and forms a horizontal pivot for the beams of the two gangs so that said gangs may swing vertically about such pivot as an axis.

The yoke 72 is provided with a vertical bore and is internally screw-threaded to screw upon the screw-threaded portion 25 of the crank 26, as best shown in Figs. 5 and 7. It will be evident that by this construction rotation of the crank 26 will cause the yoke 72 to move up or down along the threaded portion of said crank, thereby raising or lowering the pivot 76 at the forward ends of the two gangs A and B. As will presently be explained, the gangs are pivotally supported intermediately of the length of their beams upon the draft frame by means of the arch bar 14 and the lifting connections, and the purpose of providing for vertical adjustment of the front ends of the beams is to compensate for adjustments of the depth of plowing so that the gangs can be lowered horizontally to avoid tipping of the plow, and to provide for giving the plows more or less suck, as may be desired. This will be more clearly understood when the lifting connections by which the gangs are raised and lowered shall have been described.

The connections by which the gangs are raised or lowered will now be described. There are two sets of such connections, one for each gang, and they are mounted upon the horizontal portion of the arch bar 14 at opposite sides of the center thereof. As said sets are alike, only one will be described in detail, the corresponding parts of the other set being indicated by like reference numerals with the addition of the exponent $a$. The lifting connections for gang A include a vertically swinging lifting member comprising a transversely disposed rock shaft 77 that is mounted in suitable bearings in brackets 78, 79 secured to the arch bar 14, as best shown in Fig. 1. At its inner end this rock shaft is provided with an arm 80 extending substantially at right angles to the axis of the shaft and preferably formed by bending the shaft. At its outer end, preferably outside of and adjacent to the bracket 78, said shaft carries a three-armed lever 81, best shown in Fig. 5. The lever 81 is detachably connected with the rock shaft 77, and is preferably secured thereon by providing it at one of its angles with a tapered sleeve 82 (see Fig. 6) adapted to fit on the tapered and squared end 83 of the shaft 77, where it is secured by a nut 84 screwed upon the end of the shaft 77. Thus the lever 81 may be caused to swing in a longitudinal vertical plane by rocking said shaft. As shown in Fig. 5, one of the arms of the lever 81 normally extends downward and rearwardly, and at its outer end is provided with a sleeve 85 with which is connected the upper end of a thrust rod 86 which connects the lever 81 with the crank 39 on the clutch actuated shaft 38. Preferably, the thrust rod 86 is made in two parts so that its length may be adjusted, the upper part being in the form of a screw-threaded rod, while the lower part is tubular and internally threaded at its upper end to connect with said upper part.

At its lower end said rod carries a yoke 87 that is swiveled thereon, and has mounted in it, on a pivot 88, a bearing sleeve 89 provided with an opening 90 adapted to fit on the crank 39. This construction is best shown in Fig. 9, which shows the rod 86 as provided with a shoulder 91 immediately above the yoke 87, and with a collar 92 secured upon its lower end by a pin 93 so that it cooperates with the shoulder 91 to hold the yoke 87 in place on said rod without interfering with its rotation thereon. It will be evident from the foregoing description that rotation of the crank shaft 38 will reciprocate the thrust rod 86 and consequently will rock the three-armed lever 81 and with it the rock shaft 77. As has been explained, the crank shaft is rotated by power from the adjacent ground wheel whenever the clutch mechanism is thrown into operation, and, therefore, during one cycle of the rotation of the clutch mechanism the thrust rod 86 will be moved upward, and during the next cycle it will be moved downward.

Pivotal connection is made between the upper end of the thrust rod 86 and the downwardly extending arm of the lever 81 by means of a bail 94 that is arranged parallel with and back of the arch bar 14 and at its outer end is bent back upon itself, as shown at 95 in Fig. 6, to provide an inwardly extending arm 96 spaced from the main portion of the bail and adapted to fit into the bearing in the sleeve 85 which forms a pivotal support for it. This arm also extends through an eye 97 at the upper end of the thrust rod 86 so that it connects said rod with the lever 81. Preferably a collar 98 and set screw 99 are provided to position the arm 96 with reference to the thrust rod 86 and lever 81, as shown in Fig. 6.

The inner end of the bail 94 is squared and tapered and carries a correspondingly shaped sleeve 100 fixed on the outer end of a link 101 which is bifurcated and receives between its spaced members 102, 103 the outer end of the arm 80, which is secured between said members by a pin 104, as shown in Fig. 6. The described connections between the bail 94 and rock shaft 77 are such that they are held in parallelism with each other, but owing to the location of the pivotal connections between the bail and said rock shaft it may be swung up or down independently of the rocking of said rock shaft, about an axis that is eccentric to the axis of said shaft but is parallel therewith, for a purpose to be presently explained.

Also mounted on the bail 94 in such position that they overlie the beams of one of the gangs, in this instance the gang A, are two vertically disposed sleeves 105, 106, which are journaled upon said bail in properly spaced relation to each other by means of auxiliary sleeves 107, 108 formed integral respectively with the sleeves 105, 106 and having their axes at right angles to the axes of the latter sleeves. The auxiliary sleeves 107, 108 are journaled on the bail 94, the sleeve 107 being positioned thereon by a collar 109, and the sleeve 108 being positioned by the sleeve 100 and a nut 110 screwed on the end of the bail, as shown in Fig. 6. Rods 111, 112 have their lower ends connected with the beams of gang A by yokes 113, 114, respectively, and bolts 115, 116, said yokes being swiveled on the lower ends of the rods and embracing heads 117 at the lower ends thereof, as indicated by dotted lines in Fig. 5. The upper ends of the rods 111, 112 extend through the sleeves 105, 106, respectively, and are screw threaded to receive nuts 118, 119 placed above and below said sleeves so that the operative length of the rods can be readily adjusted.

By this construction it will be seen that when the bail 74 is swung up or down such motion will be communicated by means of the rods 111, 112 to the gang connected therewith.

Pivotally mounted on the bail 94 adjacent to the sleeve 107 is another sleeve 120 which is adapted to rock in a vertical plane and is held against movement endwise of the bail by a collar 121 secured by a set screw. The sleeve 120 is internally threaded, and through it works an adjusting rod 122, screw threaded at its lower end as shown in Fig. 6. The upper end of the rod 122 has a bearing in a sleeve 123 carried by the third arm of the lever 81, as shown in Fig. 5, immediately below which sleeve said rod is provided with a shoulder 124, best shown in Fig. 7. Above the sleeve 123 the rod 122 is connected by a universal coupling 125 with the lower end of a crank 126, best shown in Figs. 5 and 7. This crank is supported so that it may be rotated, and also moved endwise, by a bracket that rises from the draft frame and projects forward from the arch bar 14 thereof, as best shown in Fig. 7. This bracket preferably comprises two bars 127, 128, secured at their lower ends to the arch bar 14 at some distance apart, their upper ends being joined and secured together by rivets 129. A brace 130 secured to the joined upper ends of said bars and to the brace bars 16 serves to support and hold the bracket steady. The bar 128 rises somewhat higher than the other two bars and is provided with an eye 131 through which the crank 126 extends. By rotating the crank 126 the rod 122 may be rotated in the sleeve 120, which, owing to the screw threaded connection between said parts, will move the sleeve closer to or farther from the arm of the lever 81 that carries the sleeves 123, thereby swinging the bail up or down without, however, rocking the rock shaft 77 and the levers 81, since the bail will swing about its pivotal supports, provided by the arm 96, and the pivot pin 104 which connects the link 101 with the arm 80 of said rock shaft.

This movement of the bail 94, which constitutes connecting means between the lifting member 77 and the gang, is used to regulate the depth of plowing. Manifestly, if the rock shaft 77 and lever 81 are in the position they assume when the gang is lowered for operation, by rotating the crank 126 to move the sleeve 120 down on the depth adjusting rod 122 the plows will be lowered to plow deeper, since downward movement of the bail 94 will move the rods 111, 112 downward without rocking the rock shaft 77, so that they may operate at a greater depth. Conversely, by rotating the crank 126 to move the sleeve 120 upward along the depth adjusting rod 122 the plows will operate at a shallower depth. The rock shaft 77 is, of course, swung through a constant arc, since the range of its movement is determined by the crank 39, with which it is connected by the thrust rod 86, but the upper and lower limits of this rocking movement may be altered by adjusting the length of said thrust rod.

Fig. 5 shows the position of the lifting connections when one of the gangs is in its operating position, and Fig. 7 shows their position when the gang connected therewith is raised to its inoperative position. By comparison of these figures it will be seen that the sleeves 105, 106 at the upper ends of the rods 111, 112 swing vertically in an arc about the axis of the rock shaft 77 when the gang is lifted up out of operating position or lowered to such position, and that the height to which said sleeves are raised in the lifting operation is always practically the same regardless of the depth to which the plows are set to operate, since swinging the bail 94 about its pivotal connections with the rock shaft 77 to adjust the depth of plowing does not materially vary the length of the arc through which said sleeves are swung during the lifting operation.

Adjusting the sleeve 120 along the depth adjusting rod 122 changes the angular relation of the link 101 to the arm 80 of the rock shaft 77, and of the corresponding connections between the opposite end of said rock shaft and the bail 94, and because the depth adjusting rod 122 assumes an approximately vertical position when the gang is down, by such adjustment of the sleeve 120 a considerable adjustment of the depth of plowing may be effected. Thus I provide for lifting the plows at all times to substantially the same height by the operation of the clutch actuated lifting mechanism, regardless of the plowing depth at which the gang is set.

By adjusting the rods 111, 112 in the sleeves 105, 106, the beams with which they are respectively connected may be adjusted for leveling purposes, as said rods are adjustable vertically independently of each other.

As has been explained, the front ends of the beams are connected with the draft bar 12 for vertical adjustment by means of the crank 26, rotation of which causes the yoke 72 to move up or down along the threaded portion of said crank. This adjustment of the front ends of the beams, which are pivotally supported between their ends by the lifting connections, including the rods 111, 112, provides compensation for adjustment of the depth regulating devices, so that the plows can be lowered to operating position horizontally, to avoid tipping that would cause them to run out of the ground, or they may be adjusted to give more or less suck, as desired. For deeper plowing the front ends of the beams are lowered and for shallower plowing they are raised, and by providing the two adjustments described the plow bottoms can always be made to run level at any depth.

Obviously, since the operation of raising or lowering the gangs does not affect the setting of the depth adjusting devices, the plows after having once been set to operate at a given depth will always return to that depth after having been lifted out of operating position.

As has been explained, the lifting devices of the two gangs are alike, and are independent of each other, so that either gang may be adjusted separately except as to the front end adjustment which is effected by the crank 26 as to both gangs, but as only one gang operates at a time, independent adjustment at that point is unnecessary.

The operation of the plow as a whole need not be described in detail, as it is fully set forth in my pending application, Serial No. 260,872, hereinbefore referred to. It will suffice to say that when either gang is lowered to operating position the resulting lateral deflection of the line of draft automatically causes the draft frame to swing laterally, under the force of the draft, in the appropriate direction to carry its front pivot into such line of draft. Coincidently the ground wheels are automatically steered to direct them toward a position of parallelism with such deflected line of draft, and thereby carry the center of resistance of the operating gang toward, and ultimately into coincidence with, a normal central line of draft parallel with the line of advance, and dying in a longitudinal vertical plane coincident with the center of power of the tractor or other drawing means. These general features of construction are not herein claimed separately as they constitute the subject-matter of my pending application last referred to.

It should be understood that in describing in detail the particular embodiment of my invention shown in the drawings, I have not intended by so doing to limit the claims hereinafter made to such specific construction, except in so far as they may be expressly directed to structural details. Obviously the construction shown and described may be modified in various respects without departing from the invention defined by the broader claims.

I claim:

1. A two-way plow comprising a frame, ground wheels supporting said frame at the sides thereof, oppositely acting gangs connected with said frame for alternate movement into or out of operative position, and separately operable lifting devices connected with said gangs, respectively, each comprising members movable in unison to lift the gang connected therewith to approximately the same height regardless of the plowing depth thereof, and movable relatively to each other to vary the depth of plowing.

2. A two-way plow comprising a frame, dirigible ground wheels supporting said frame at the sides thereof, oppositely acting gangs connected with said frame for alternate movement into or out of operative position, separately operable lifting devices for said gangs, respectively, each comprising cooperating members operable to lift the gang connected therewith to approximately the same height regardless of the plowing depth thereof, and movable relatively to each other to vary the depth of plowing, and means adapted to be actuated by the ground wheels to operate said lifting devices.

3. A two-way plow comprising a frame, ground wheels supporting said frame at the sides thereof, oppositely acting gangs connected with said frame and movable alternately into or out of operative position, means operable to vertically adjust the forward ends of said gangs, and separately operable lifting devices for said gangs, respectively, each comprising members movable in unison to lift the gang connected therewith to approximately the same height regardless of the plowing depth thereof, and movable relatively to each other to vary the depth of plowing.

4. A two-way plow comprising a frame, dirigible ground wheels supporting said frame at the sides thereof, oppositely acting gangs connected with said frame and movable alternately into or out of operative position, means operable to vertically adjust the forward ends of said beams, separately operable lifting devices for said gangs respectively, and means operable by the ground wheels to actuate the lifting devices associated with said gangs, said lifting devices including means operable to separately adjust the depth of plowing of said gangs.

5. A two-way plow comprising a frame, ground wheels supporting said frame at the sides thereof, oppositely acting gangs connected with said frame for alternate movement into or out of operative position, each of said gangs including a beam pivotally connected with the frame, means for vertically adjusting the forward ends of said beams, separately operable lifting devices for said gangs, each of said lifting devices including a lifting member and means movable in unison with said lifting member to lift the gang, and operable independently of the operation of such lifting member to adjust the depth of plowing of the gang connected therewith, and means for actuating said lifting devices.

6. A two-way plow comprising a frame, dirigible ground wheels supporting said frame at the sides thereof, oppositely acting gangs connected with said frame for alternate movement into or out of operative position, each of said gangs including a beam pivotally connected with the frame, means for vertically adjusting the forward ends of said beams, separately operable lifting devices for said gangs, each of said lifting devices including means operable independently of the operation of such lifting device to adjust the depth of plowing of the gang connected therewith, and means for actuating said lifting devices.

7. A two-way plow comprising a frame, ground wheels supporting said frame at the sides thereof, gangs connected with said frame for alternate movement into or out of operative position, separately operable lifting devices for said gangs, each of said lifting devices including a lifting member and means connected therewith and with one of the gangs and adjustable independently of the actuation of such lifting member to vary the depth of plowing, said depth adjusting means being movable to approximately the same height by the operation of the lifting member connected therewith, regardless of the plowing depth, and means for operating said lifting devices.

8. A two-way plow comprising a frame, ground wheels supporting said frame at the sides thereof, gangs connected with said frame for alternate movement into or out of operative position, separately operable lifting devices for said gangs, each of said lifting devices including means connected with one of the gangs and adjustable independently of the actuation of such lifting device to vary the depth of plowing, the latter means being movable to approximately the same height by the operation of the lifting member connected therewith, regardless of the plowing depth, means for operating said lifting devices, and means for vertically adjusting the front ends of said gangs.

9. A two-way plow comprising a frame, ground wheels supporting said frame at the sides thereof, oppositely acting gangs, including beams connected with said frame and movable alternately into or out of operative position, means carried by said frame operable to vertically adjust the front ends of said gangs, and separately operable gang lifting devices mounted on said frame, each of said lifting devices including a vertically swinging lifting member, and a vertically swinging connecting member connected therewith for adjustment independently of the actuation of said lifting member to vary the depth of plowing of the gang connected therewith, and swingable in unison with said lifting member to lift such gang.

10. A two-way plow comprising a frame, ground wheels supporting said frame at the sides thereof, oppositely acting gangs connected with said frame for alternate movement into or out of operative position, separately operable lifting devices for said gangs, each of said lifting devices including a vertically swinging lifting member, connecting means adapted to swing with said lifting member, and also to swing vertically independently of the actuation of such lifting member to adjust the gang connected therewith to vary the depth of plowing, and means operable to adjust said connecting means with respect to said lifting member, and ground wheel operated means for actuating the lifting devices associated with said gangs.

11. A two-way plow comprising a frame, ground wheels supporting said frame at the sides thereof, oppositely acting gangs connected with said frame for alternate movement into or out of operative position, and separately operable lifting devices for said gangs respectively, each of said lifting devices comprising a rock shaft mounted on said frame, a member pivotally connected with said rock shaft to swing relatively thereto in a vertical plane, means connecting said member with one of the gangs, and means for adjustably holding said member against swinging with respect to said rock shaft.

12. A two-way plow comprising a frame, ground wheels supporting said frame at the sides thereof, oppositely acting gangs connected with said frame for alternate movement into or out of operative position, and separately operable lifting devices for said gangs respectively, each of said lifting devices comprising a rock shaft mounted on said frame and having projecting arms, a member pivotally connected with said arms to swing in a vertical plane with respect to said rock shaft, means connecting said member with one of said gangs, and means carried by said rock shaft to rock therewith and adjustably connected with said member, for holding said member against swinging with respect to the rock shaft and for adjusting it relatively thereto to vary the depth of plowing.

13. A two-way plow comprising a frame, ground wheels supporting said frame at the sides thereof, oppositely acting gangs connected with said frame for alternate movement into or out of operative position, and separately operable lifting devices for said gangs respectively, each of said lifting devices comprising a three-armed lever mounted on the frame to swing in a vertical plane, a bail pivotally connected with one of the arms of said lever to swing relatively thereto in a vertical plane, means connected with said lever and with said bail for swinging said bail with respect to said lever and for holding it in fixed relation thereto, means connecting said bail with one of the gangs for lifting the gang by the operation of said lever, and means connected with said lever for swinging the same to raise or lower such gang.

14. A two-way plow comprising a frame, ground wheels supporting said frame at the sides thereof, oppositely acting gangs connected with said frame for alternate movement into or out of operative position, and separately operable lifting devices for said gangs respectively, each of said lifting devices comprising a three-armed lever mounted on the frame to swing in a vertical plane, a bail pivotally connected with one of the arms of said lever to swing relatively thereto in a vertical plane, means connected with said bail for swinging said bail with respect to lever and with said bail for swinging said bail with respect to said lever and for holding it in fixed relation thereto, means connecting said bail with one of the gangs for lifting the same by the operation of said lever, and ground wheel operated means connected with said lever for actuating the same to raise or lower such gang.

15. A two-way plow comprising a frame, dirigible ground wheels supporting said frame at the sides thereof, oppositely acting gangs connected with said frame for alternate movement into or out of operative position, and separately operable lifting devices for said gangs respectively, each of said lifting devices comprising a three-armed lever mounted on the frame to swing in a vertical plane, a bail pivotally connected with one of the arms of said lever to swing relatively thereto in a vertical plane, means connected with said lever and with said bail for swinging said bail with respect to said lever and for holding it in fixed relation thereto, means connecting said bail with one of the gangs for lifting the gang by the operation of said lever, and means connected with said lever and actuated by one of said ground wheels for operating said lever to raise or lower the gang connected therewith.

16. A two-way plow comprising a draft frame including a transversely disposed arch bar and forwardly converging side members, dirigible ground wheels at the opposite ends of said arch bar for supporting said frame, two oppositely acting forwardly converging gangs in fixed angular relation to each other, said gangs being movable alternately into operative position, and being pivotally supported by said arch bar, means for vertically adjusting the forward portions of said gangs, and separately operable lifting devices for said gangs, respectively, each comprising a lifting member, and depth adjusting means adjustable relatively to said lifting member to vary the depth of plowing, and movable with said lifting member to lift the gang connected therewith to approximately the same height regardless of the plowing depth of such gang.

17. A two-way plow comprising a draft frame including a transversely disposed arch bar and forwardly converging side members, dirigible ground wheels at the opposite ends of said arch bar for supporting said frame, two oppositely acting forwardly converging gangs in fixed angular relation to each other, said gangs being movable alternately into operative position, and being pivotally supported by said arch bar, means for vertically adjusting the forward portions of said gangs, and separately operable lifting devices for said gangs, respectively, each comprising a vertically swinging lifting member, and depth adjusting means adapted to swing with said lifting member to lift the gang connected therewith to approximately the same height regardless of the plowing depth of such gang, and means operable to swing said depth adjusting means vertically independently of said lifting member.

18. A two-way plow comprising a draft frame including a transversely disposed arch bar and forwardly converging side members, dirigible ground wheels at the opposite ends of said arch bar for supporting said frame, two oppositely acting forwardly converging gangs in fixed angular relation to each other, said gangs being movable alternately into operative position, and being pivotally supported by said arch bar, means for vertically adjusting the forward portions of said gangs, and separately operable lifting devices for said gangs each comprising a lever mounted on said arch bar to rock in a vertical plane, a bail connected with said lever to swing vertically about an axis eccentric to and parallel with the axis of said lever, means connected with said lever and with said bail for holding said bail in fixed relation to said lever, and adjustable to swing said bail in a vertical plane independently of the rocking of said lever, and means connecting said bail with one of the gangs for lifting said gang by the operation of said lever.

19. A two-way plow comprising a draft frame including a transversely disposed arch bar and forwardly converging side members, dirigible ground wheels at the opposite ends of said arch bar for supporting said frame, two oppositely acting forwardly converging gangs in fixed angular relation to each other, said gangs being movable alternately into operative position, and being pivotally supported by said arch bar, means for vertically adjusting the forward portions of said gangs, and separately operable lifting devices for said gangs each comprising a lever mounted on said arch bar to rock in a vertical plane, a bail connected with said lever to swing vertically about an axis eccentric to and parallel with the axis of said lever, means connected with said lever and with said bail for holding said bail in fixed relation to said lever, and adjustable to swing said bail in a vertical plane independently of the rocking of said lever, means connecting said bail with one of the gangs for lifting said gang by the operation of said lever, and means adapted to be actuated by one of the ground wheels for rocking said lever.

20. A two-way plow comprising a draft frame including a transversely disposed arch bar and forwardly converging side members, dirigible ground wheels at the opposite ends of said arch bar for supporting said frame, a laterally swinging draft member connected with the forward portion of said frame, means connected with said draft member for controlling the position of said wheels, two oppositely acting forwardly converging gangs in fixed angular relation to each other, said gangs being movable alternately into operative position, and being pivotally supported by said arch bar, means for vertically adjusting the forward portions of said gangs, and separately operable lifting devices for said gangs each comprising a lever mounted on said arch bar to rock in a vertical plane, a bail connected with said lever to swing vertically about an axis eccentric to and parallel with the axis of said lever, means connected with said lever and with said bail for holding said bail in fixed relation to said lever, and adjustable to swing said bail in a vertical plane independently of the rocking of said lever, means connecting said bail with one of the gangs for lifting said gang by the operation of said lever, and means adapted to be actuated by one of the ground wheels for rocking said lever.

21. A plow comprising a frame, ground wheels supporting said frame at the sides thereof, a gang connected with said frame for movement into or out of operative position, lifting means connected with said gang, comprising members movable in unison to lift lift the gang to approximately the same height regardless of the plowing depth thereof, and movable relatively to each other to vary the depth of plowing, and means for actuating said lifting means.

22. A plow comprising a frame, ground wheels supporting said frame at the sides thereof, a gang connected with said frame for movement into or out of operative position, lifting means connected with said gang, comprising members movable in unison to lift the gang to approximately the same height regardless of the plowing depth thereof, and movable relatively to each other to vary the depth of plowing, and means adapted to be actuated by one of the ground wheels to operate said lifting means.

23. A plow comprising a frame, ground wheels supporting said frame at the sides thereof, a gang connected with said frame for movement into or out of operative position, and lifting means comprising a swinging lifting member mounted on the frame and adapted to be actuated to lift the gang, a depth adjusting member supported by said lifting member for movement relatively thereto, and connected with the gang, and means for securing said members together to swing in unison, and for adjusting them with respect to each other to vary the depth of plowing.

24. A plow comprising a frame, ground wheels supporting said frame at the sides thereof, a gang connected with said frame for movement into or out of operative position, lifting means comprising a swinging lifting member mounted on the frame and adapted to be actuated to lift the gang, a depth adjusting member connected with said lifting member for movement angularly relatively thereto, and adjustable means for securing said depth adjusting member in fixed relation to said lifting member to swing therewith about the axis thereof, means connecting said depth adjusting member with the gang, and means for applying lifting force to said lifting member.

25. A plow comprising a frame, ground wheels supporting said frame at the sides thereof, a gang connected with said frame for movement into or out of operative position, means carried by said frame operable to vertically adjust the front end of said gang, and lifting means mounted on the frame, said lifting means including a vertically swinging lifting member, a vertically swinging connecting member connected therewith for adjustment independently of the actuation of said lifting member, to vary the depth of plowing, and swingable in unison with said lifting member to lift the gang, said connecting member being connected with the gang.

26. A plow comprising a frame, ground wheels supporting said frame at the sides thereof, a gang connected with said frame for movement into or out of operative position, and lifting means for said gang including a vertically swinging lifting member, connecting means adapted to swing with said lifting member, and also to swing vertically independently of the actuation of said lifting member to vary the depth of plowing, and means operable to adjust said connecting means with respect to said lifting member, said connecting means being connected with the gang, and means for applying lifting force to said lifting member.

27. A plow comprising a frame, ground wheels supporting said frame at the sides thereof, a gang connected with said frame for movement into or out of operative position, and lifting means for said gang comprising a rock shaft mounted on said frame, a member pivotally connected with said rock shaft to swing relatively thereto in a vertical plane, means connecting said member with the gang, and means for adjustably holding said member against swinging with respect to said rock shaft.

28. A plow comprising a frame, ground wheels supporting said frame at the sides thereof, a gang connected with said frame for movement into or out of operative position, and lifting means for said gang comprising a rock shaft mounted on said frame and having projecting arms, a member pivotally connected with said arms to swing in a vertical plane with respect to said rock shaft, means connecting said member with said gang, and means carried by said rock shaft to rock therewith and adjustably connected with said member, for holding said member against swinging with respect to the rock shaft and for adjusting it relatively thereto to vary the depth of plowing, said member being connected with the gang, and means for applying lifting force to said rock shaft.

29. A plow comprising a frame, ground wheels supporting said frame at the sides thereof, a gang connected with said frame for movement into or out of operative position, and lifting means for said gang comprising a three-armed lever mounted on the frame to swing in a vertical plane, a bail pivotally connected with one of the arms of said lever to swing relatively thereto in a vertical plane, means connected with said lever and with said bail for swinging said bail with respect to said lever and for holding it in fixed relation thereto, means connecting said bail with the gang for lifting the gang by the operation of said lever, and means connected with said lever for swinging the same to raise or lower the gang.

30. A plow comprising a frame, ground wheels supporting said frame at the sides thereof, a gang connected with said frame for movement into or out of operative position, and lifting means for said gang comprising a three-armed lever mounted on the frame to swing in a vertical plane, a bail pivotally connected with one of the arms of said lever to swing relatively thereto in a vertical plane, means connected with said lever and with said bail for swinging said bail with respect to said lever and for holding it in fixed relation thereto, means connecting said bail with the gang for lifting the same by the operation of said lever, and ground wheel operated means connected with said lever for actuating the same to raise or lower the gang.

31. A plow comprising a frame, dirigible ground wheels supporting said frame at the sides thereof, a gang connected with said frame for movement into or out of operative position, and lifting means for said gang comprising a three-armed lever mounted on the frame to swing in a vertical plane, a bail pivotally connected with one of the arms of said lever to swing relatively thereto in a vertical plane, means connected with said lever and with said bail for swinging said bail with respect to said lever and for holding it in fixed relation thereto, means connecting said bail with the gang for lifting the same by the operation of said lever, and means connected with said lever and actuated by one of said ground wheels for operating said lever to lift the gang.

32. A plow comprising a frame, ground wheels supporting said frame at the sides thereof, a gang connected with said frame for movement into or out of operative position, and lifting means comprising a lever mounted on the frame to rock in a vertical plane, a bail connected with said lever to swing vertically about an axis eccentric to and parallel with the axis of said lever, and means connected with said lever and with said bail for holding said bail in fixed relation to said lever, and adjustable to swing said bail in a vertical plane independently of the rocking of said lever, means connecting said bail with the gang for lifting the same by the operation of said lever, and means for rocking said lever.

33. A lifting device for agricultural implements comprising a suitable support, a swinging lifting member mounted on said support to swing vertically, a depth adjusting member connected with said lifting member for vertical angular adjustment with respect thereto, adjustable means for securing said depth adjusting member in fixed relation to said lifting member to swing therewith about the axis thereof, means for connecting said depth adjusting member with the implement, and means for applying lifting force to said lifting member.

34. A lifting device for agricultural implements comprising a suitable support, a swinging lifting member mounted on said support to swing vertically, a depth adjusting member connected with said lifting member for vertical angular adjustment with respect thereto, means for holding said depth adjusting member in fixed relation to said lifting member to swing therewith about the axis thereof, said holding means being operable to adjust the angular relation of said members to each other independently of movement of said lifting member, means for connecting said depth adjusting member with the implement, and means for applying lifting force to said lifting member.

35. A lifting device for agricultural implements comprising a suitable support, a swinging lifting member mounted on said support to swing vertically, a depth adjusting member pivotally connected with said lifting member to swing relatively thereto about an axis eccentric to the axis of said lifting member, and adapted to swing therewith about the latter axis, adjustable means for securing said depth adjusting member in fixed relation to said lifting member to swing therewith about the axis thereof, means for connecting said depth adjusting member with the implement, and means for applying lifting force to said lifting member.

CARL G. STRANDLUND.

CERTIFICATE OF CORRECTION.

Patent No. 1,813,506.  Granted July 7, 1931, to

CARL G. STRANDLUND.

It is hereby certified that error appears in the printed specification of the above numbered patent requiring correction as follows: Page 7, line 1, for "dying" read lying; line 127, claim 8, after "including" insert a lifting member and; same line, after "connected" insert therewith and; line 129, for "device" read member; line 130, for "the latter" read said depth adjusting; page 8, line 106, claim 14, strike out "bail for swinging said bail with respect to"; page 10, line 2, claim 21, strike out the word "lift"; and that the said Letters Patent should be read with these corrections therein that the same may conform to the record of the case in the Patent Office.

Signed and sealed this 29th day of September, A. D. 1931.

(Seal)
M. J. Moore,
Acting Commissioner of Patents.